United States Patent
Wang

(10) Patent No.: US 7,837,380 B2
(45) Date of Patent: Nov. 23, 2010

(54) GUARDING STRUCTURE FOR A MIXER OF MOLDING MATERIAL

(76) Inventor: Shu-Lung Wang, 6F, No. 70, Sec. 1, Kuang-Fu Rd., San-Chung City, Taipei Hsien (TW)

( * ) Notice: Subject to any disclaimer, the term of this patent is extended or adjusted under 35 U.S.C. 154(b) by 1000 days.

(21) Appl. No.: 11/645,175

(22) Filed: Dec. 26, 2006

(65) Prior Publication Data
US 2008/0151685 A1 Jun. 26, 2008

(51) Int. Cl.
*B01F 9/22* (2006.01)

(52) U.S. Cl. .................................... 366/217

(58) Field of Classification Search ......... 366/108–128, 366/208–217, 219, 605; 494/82; 74/86
See application file for complete search history.

(56) References Cited

U.S. PATENT DOCUMENTS

| | | | |
|---|---|---|---|
| 3,469,824 A * | 9/1969 | Futty | 366/64 |
| 4,235,553 A * | 11/1980 | Gall | 366/208 |
| 4,497,581 A * | 2/1985 | Miller | 366/208 |
| 7,182,506 B2 * | 2/2007 | Schulz et al. | 366/217 |
| 7,487,958 B2 * | 2/2009 | Wang | 267/136 |
| 7,507,015 B2 * | 3/2009 | Wang | 366/217 |
| 7,520,660 B2 * | 4/2009 | Schulz et al. | 366/217 |
| 2006/0254869 A1 * | 11/2006 | Wang | 188/378 |
| 2006/0258496 A1 * | 11/2006 | Wang | 474/101 |
| 2007/0025180 A1 * | 2/2007 | Ishii | 366/139 |
| 2007/0070804 A1 * | 3/2007 | Wang | 366/217 |
| 2007/0189116 A1 * | 8/2007 | Wang | 366/279 |
| 2008/0151685 A1 * | 6/2008 | Wang | 366/217 |
| 2008/0159066 A1 * | 7/2008 | Wang | 366/217 |

FOREIGN PATENT DOCUMENTS

| | | | |
|---|---|---|---|
| TW | 274741 A | | 4/1996 |
| TW | M278472 U | | 10/2005 |
| WO | 2007/110189 A1 | * | 10/2007 |

* cited by examiner

*Primary Examiner*—Charles E Cooley
(74) *Attorney, Agent, or Firm*—Muncy, Geissler, Olds & Lowe, PLLC

(57) ABSTRACT

A guarding structure for a mixer of molding material that has a shock absorbing chassis containing a detention board and a mixer body held in the shock absorbing chassis and run through the detention board includes an anchor member between the mixer body and the detention board. The anchor member is fastened to the detention board to form a tight coupling with the mixer body so that the mixer body is held firmly in the detention board.

5 Claims, 3 Drawing Sheets

GUARDING STRUCTURE FOR A MIXER OF MOLDING MATERIAL

FIELD OF THE INVENTION

The present invention relates to a guarding structure and particularly to a guarding structure for a mixer of molding material.

BACKGROUND OF THE INVENTION

In dentistry making of a denture has to first forming a master mold according to the teeth profile of a patient, then forming the denture through the master mold. The material of the master mold generally is formed by mixing molding powder or gypsum with water. Mixing is done by hands to make the material evenly blended and viscous. The mixed material will be cured after a period of time. As mixing by hands takes a lot of labor and cannot last a very long time, and the material cannot be blended evenly, the material often has air bubbles inside and results in a porous and coarse surface on the finished mold. This affects the quality of the denture.

To remedy the aforesaid problem, mixers for dental molding material have been developed in prior art (one of such references is R.O.C. patent publication No. 274741). It includes a transmission apparatus with a planetary gear mechanism. The molding material is mixed by rotation and also by revolution about a sun gear so that it can be evenly blended at high speed rotation and receive centrifugal force to eliminate the air bubbles.

The mixer previously discussed has extensible springs to link the top of a motor with a seat. During operation the bottom of the motor is not being anchored and tends to sway excessively. As a result the motor and equipment mounted thereon are not being held steadily. To overcome this problem, Applicant has proposed a shock absorbing structure for mixers of dental molding material (R.O.C. patent No. M278472). It includes a plurality of bracing struts, a plurality of first extensible springs, a plurality of second extensible springs, a bottom board and a detention board. The first extensible springs bridge the top end of the corresponding adjacent bracing struts and the top of a motor. The second extensible springs bridge the bottom end of the adjacent bracing struts and the bottom of the motor. The bottom board is anchored on the bottom end of the bracing struts. The detention board has a central opening. The bracing struts run through the detention board and anchored on the middle portion of the bracing struts. The motor is confined in the central opening through the constraint of the extensible springs and suspended above the bottom board. Through the first and second extensible springs that are fastened to the top and bottom of the motor, the vibration generated by the motor during operation can be absorbed to enhance the steadiness of the motor and the equipment mounted thereon.

During transportation, to prevent the mixer from being swayed and impacted in the shock absorbing structure, a plurality of screws are used to tightly fasten the bottom of the mixer to the bottom board of the shock absorbing structure. But there is still a gap between the central opening and the mixer, friction or impact between the mixer body and the detention board frequently occurs during transportation. This could result in denting, fracturing or damaging of the mixer and the detention board. There is still room for improvement.

SUMMARY OF THE INVENTION

The primary object of the present invention is to provide an anchor member to prevent friction or impact between a mixer body and a detention board during transportation.

To achieve the foregoing object, the invention provides a guarding mechanism for a mixer of molding material. The mixer includes a shock absorbing chassis which has a detention board and a mixer body held in the shock absorbing chassis and run through the detention board. The invention has the following features: an anchor member is provided between the mixer body and the detention board and fastened to the detention board to form a tight coupling with the mixer body. Therefore the mixer body is held firmly in the detention board.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
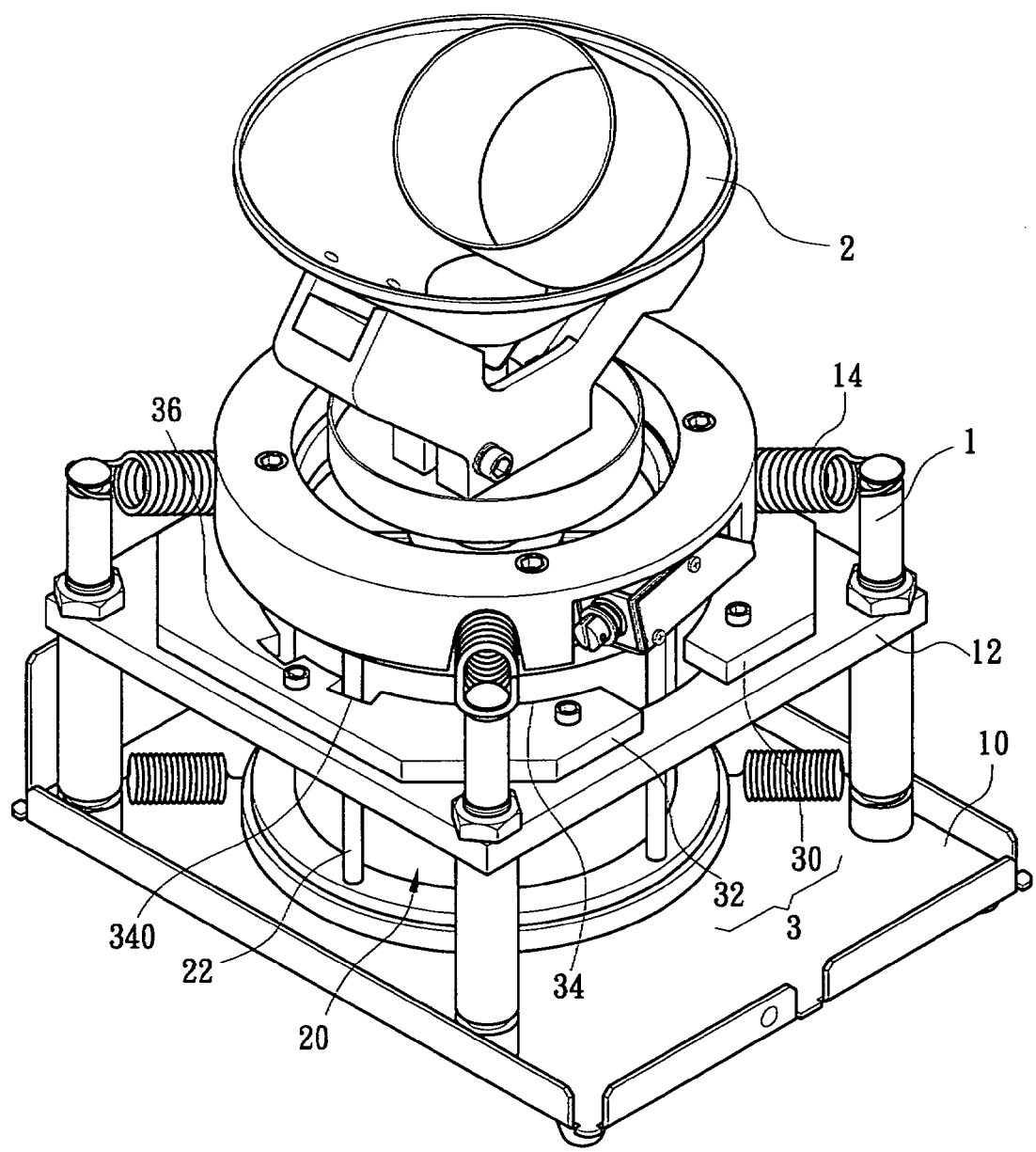
FIG. 1 is a perspective view of an embodiment of the invention.
Figure 2:
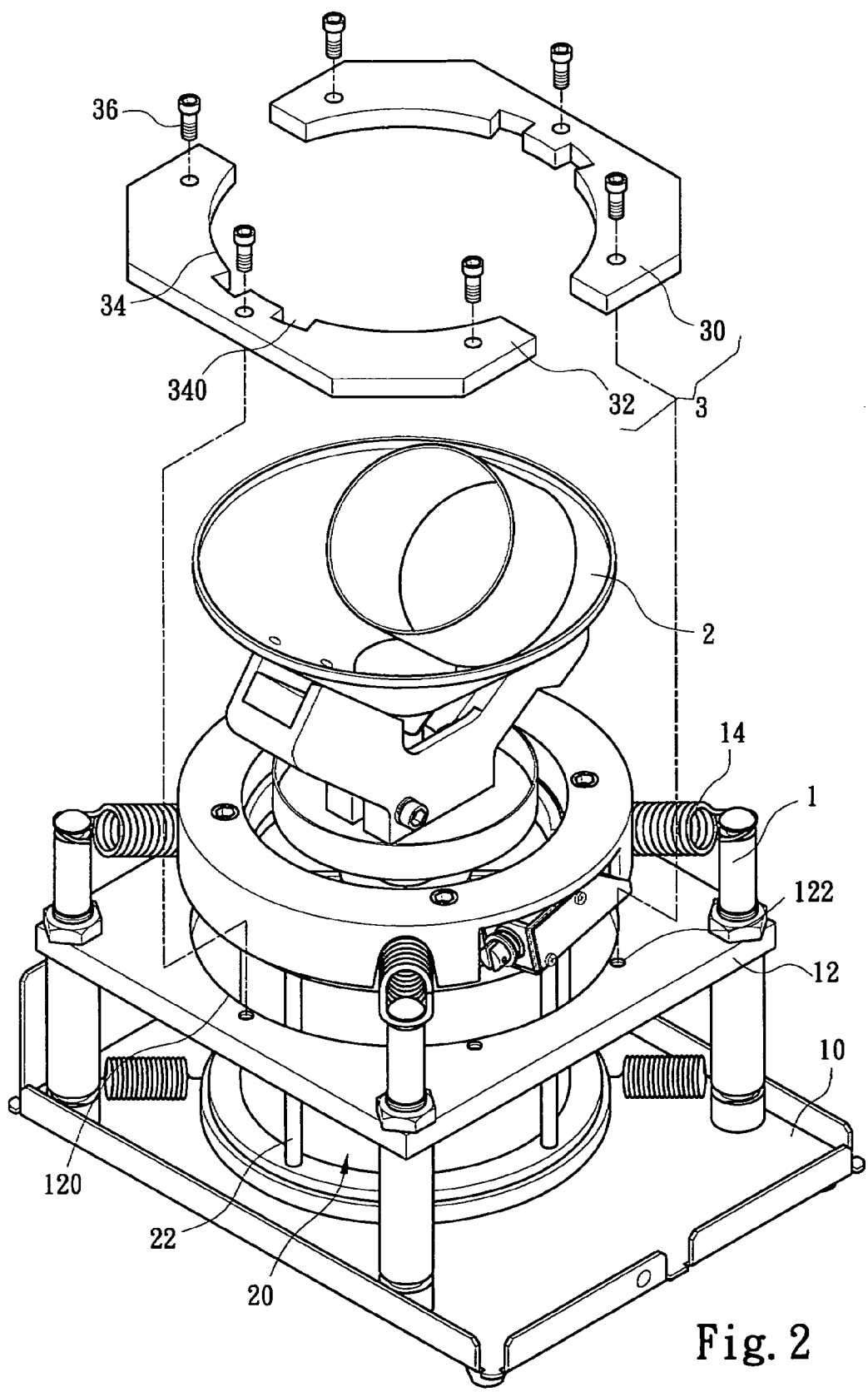
FIG. 2 is an exploded view of an embodiment of the invention.
Figure 3:
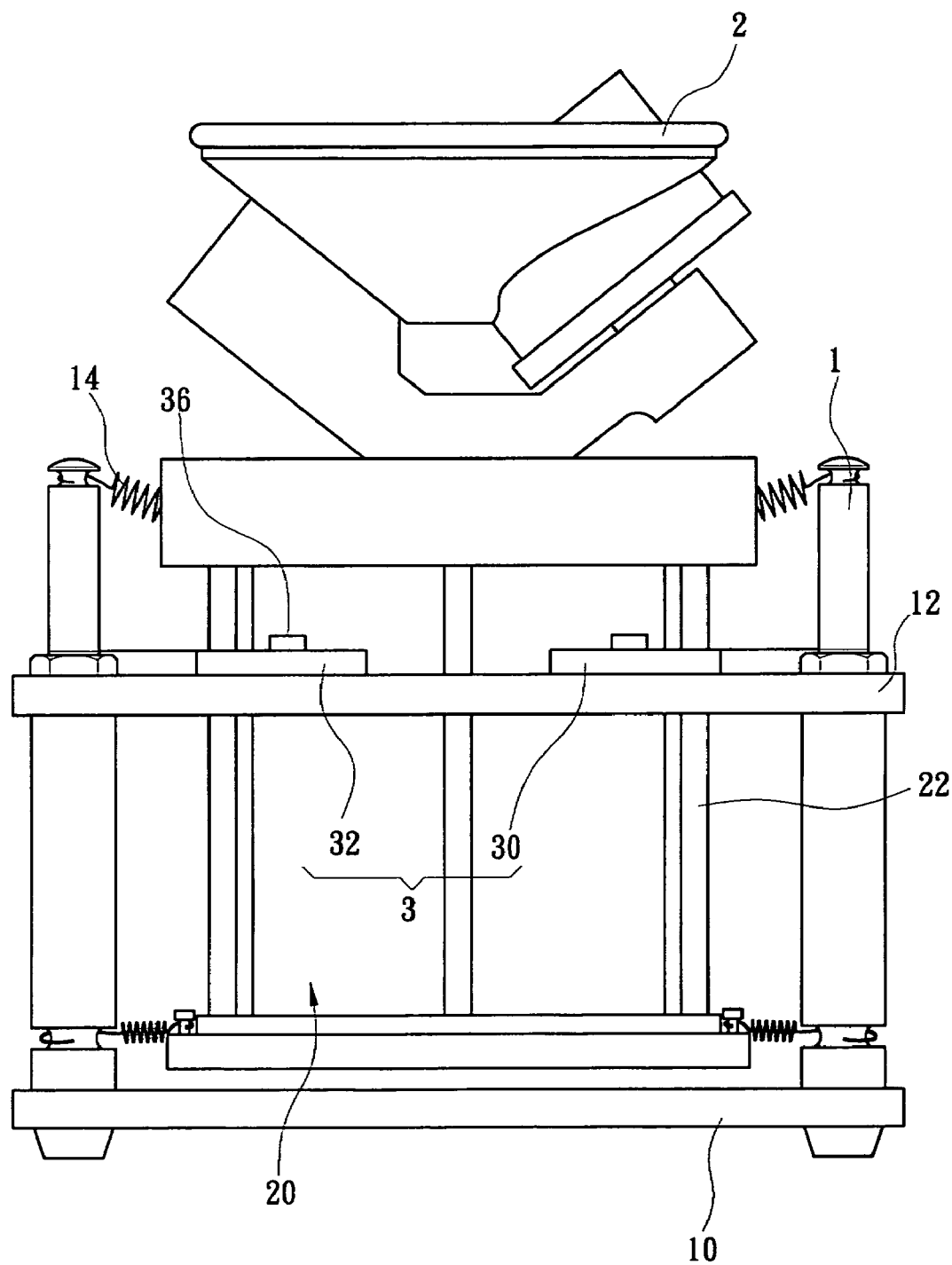
FIG. 3 is a side view of an embodiment of the invention.

Please refer to FIGS. 1, 2 and 3 for an embodiment of the guarding structure for a mixer of molding material of the invention. The mixer includes a shock absorbing chassis 1 and a mixer body 2 held in the shock absorbing chassis 1.

The shock absorbing chassis 1 has a bottom board 10 to hold the mixer body 2 and a detention board 12. The detention board 12 has a central round opening 120 to hold the mixer body 2. The shock absorbing chassis 1 is coupled with the mixer body 2 through a plurality of springs 14 which are compressible to alleviate vibration of the mixer body 2 during operation.

The mixer body 2 has a cylindrical portion 20 surrounded by a plurality of fastening struts 22.

The guarding structure of the invention includes the following features:

An anchor member 3 is provided between the mixer body 2 and the detention board 12. The anchor member 3 is fastened to the detention board 12 to form a tight coupling with the mixer body 2 so that the mixed body 2 is held firmly in the detention board 12. The anchor member 3 has an arched portion 34 corresponding to the cylindrical portion 20 to form a close coupling with the mixer body 2. The arched portion 34 further has notches 340 corresponding to and holding the fastening struts 22. In this embodiment the anchor member 3 is fastened to the detention board 12 by screwing a plurality of screws 36 in screw holes 122 formed on the detention board 12. The anchor member 3 also has a plurality of anchor elements 30 and 32 surrounding the central round opening 120 to firmly clamp and anchor the mixer body 2 in the central round opening 120. Therefore shaking occurred during transportation of the mixer does not generate friction or impact between the mixer body 2 and the detention board 12.

In short, the invention provides the anchor member 3 fastened to the detention board 12 to firmly hold the mixer body 2 in the central round opening 120 to prevent friction or impact caused by shaking during transportation of the mixer of the molding material. It offers a significant improvement over the conventional techniques.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A guarding structure for a mixer of molding material, comprising:
    a detention board;
    a shock absorbing chassis including the detention board;
    a mixer body held in the shock absorbing chassis and running through the detention board; and
    an anchor member located between the mixer body and the detention board and fastened to the detention board;
    wherein the mixer body includes a cylindrical portion, the anchor member including an arched portion corresponding to and coupling with the cylindrical portion to form a tight coupling between the mixer body and the anchor member to firmly hold the mixer body in the detention board.

2. The guarding structure for the mixer of molding material of claim 1, wherein the anchor member includes a plurality of anchor elements.

3. The guarding structure for the mixer of molding material of claim 2, wherein the detention board has a central round opening to hold the mixer body, the anchor elements surrounding the central round opening to clamp and anchor the mixer body in the central round opening.

4. The guarding structure for the mixer of molding material of claim 1, wherein the anchor member is fastened to the detention board by screwing.

5. The guarding structure for the mixer of molding material of claim 1, wherein the mixer body has a plurality of fastening struts surrounding the cylindrical portion, the arched portion having notches corresponding to the fastening struts.

* * * * *